Figure 2:
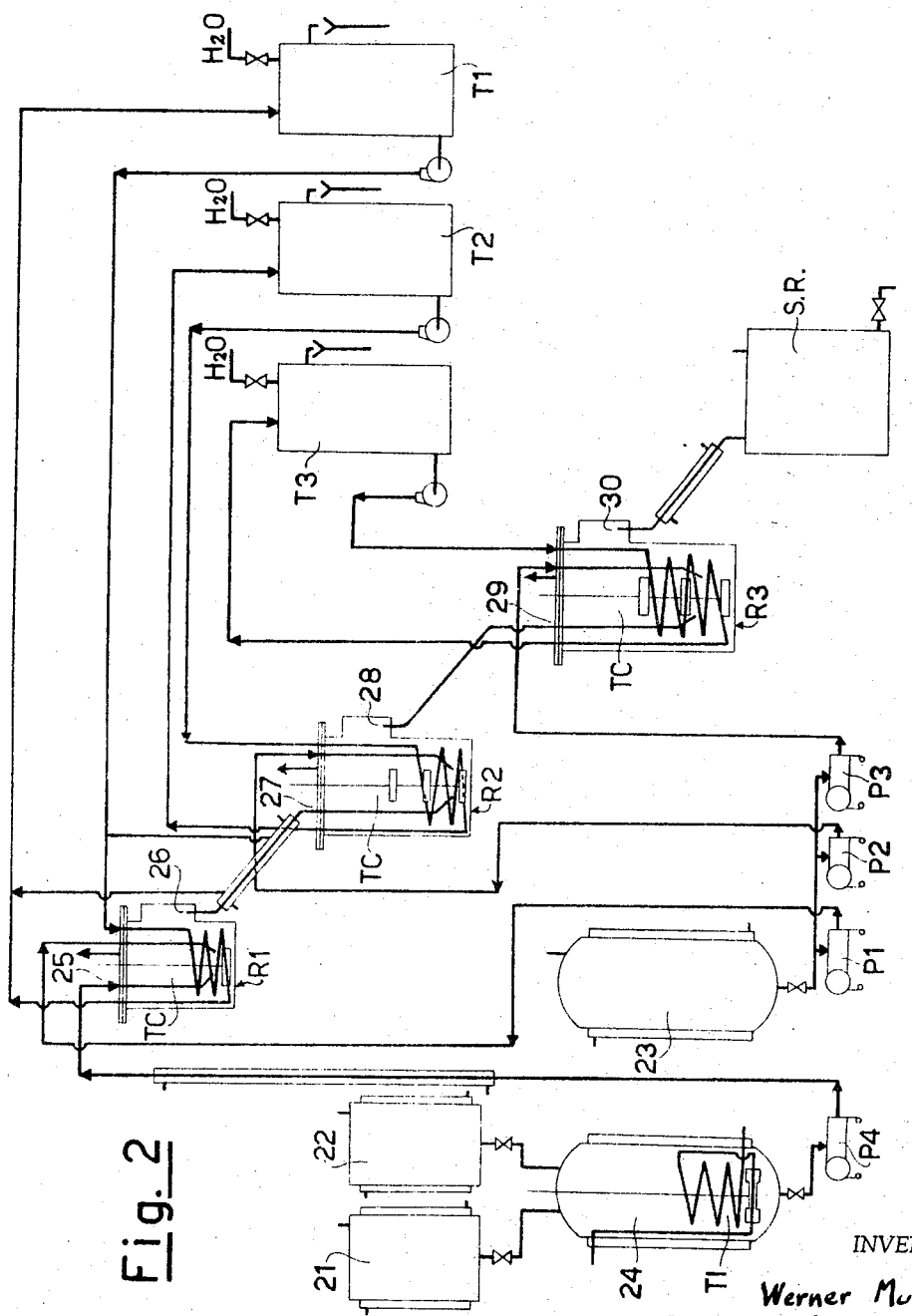

Dec. 5, 1967  W. MUENCH ETAL  3,356,675
PRODUCTION OF CAPROLACTAM FROM CYCLOHEXANOYL COMPOUNDS
Filed April 28, 1965  3 Sheets-Sheet 1

Fig. 1

INVENTORS
Werner Muench
Giuliana Silvestri and
BY Pietro Paolo Rossi

ATTORNEY

Dec. 5, 1967  W. MUENCH ET AL  3,356,675
PRODUCTION OF CAPROLACTAM FROM CYCLOHEXANOYL COMPOUNDS
Filed April 28, 1965  3 Sheets-Sheet 3

INVENTORS
Werner Muench
Giuliana Silvestri and
Pietro Paolo Rossi
BY
ATTORNEY

United States Patent Office 3,356,675
Patented Dec. 5, 1967

3,356,675
PRODUCTION OF CAPROLACTAM FROM
CYCLOHEXANOYL COMPOUNDS
Werner Muench, Barlassina, Milan, Giuliana Silvestri, Milan, and Pietro Paolo Rossi, Garlasco, Pavia, Italy, assignors to Snia Viscosa Società Nazionale Industria Applicazioni Viscosa S.p.A., Milan, Italy, a company of Italy
Filed Apr. 28, 1965, Ser. No. 451,567
Claims priority, application Italy, May 15, 1964, 10,733/64, Patent 723,201
10 Claims. (Cl. 260—239.3)

It is known that lactam can be produced by the nitrosation of cyclohexyl compounds, e.g., cyclohexane carboxylic acid, derivatives of cyclohexane carboxylic acid, or ketones containing the cyclohexyl ring. The nitrosation is generally carried out with nitrosyl sulfuric acid, or nitrosyl sulfate in the presence of sulfuric acid, of sulfuric acid containing $SO_3$, or of $SO_3$ alone.

The lactamisation of an organic substance with nitrosyl sulfuric acid is an exothermic reaction. The mixture of all the substances taking part in the reaction cannot be heated in the molar ratios necessary to obtain lactam, since under these conditions the reaction is very violent.

When the process is carried out in continuous operation and with a considerable quantity of reagents, the reaction can be made to take place only by diluting the reagents themselves. An inert substance which is miscible with the reagents may be used as a diluent. However, it is difficult to find a suitable diluent which is economically convenient to use. The diluent that has been used in the industrial field is the mixture of the reaction products as obtained at the end of the lactamisation.

This method makes it possible to carry out the lactamisation on an industrial scale, but the yields obtained either are lower than 90%; calculated on the basis either of the nitrosyl sulfate or of the cyclohexane carboxylic acid used, or else reach the 90% limit but are not always constant.

It has been proposed, furthermore, that the lactamisation of compounds containing the cyclohexyl ring—still operating as described above—should be carried out in the presence of an inert organic solvent which is not miscible with the reaction mass, especially cyclohexane, in order to eliminate the heat of reaction. When this method is used, the yields obtained, calculated on the basis of the cyclohexane carboxylic acid and the nitrosyl sulfate used, are lower, on the average, than those obtained when the nitrosation reaction is carried out in the absence of the inert solvent.

In lactamisation, even if satisfactory yields are obtained, the formation of by-products cannot be completely prevented. In particular, the process produces small amounts of cyclohexane carboxylic acid amide or amides of other acids. The mechanism of the formation of these by-products and the reason for the variations in yield, for the case when the lactamisation is carried out according to the methods described thus far, have now been explained.

According to present knowledge, the reaction does not produce lactam directly but instead produces caproimidyl sulfate, which also happens in Beckmann's rearrangement.

Under the conditions of the reaction the caproimidyl sulfate is not completely stable. It is partially decomposed by concentrated sulfuric acid or by sulfuric acid containing $SO_3$, with the formation of $SO_2$, $CO_2$, water and sulfonamides, and the yield is thereby reduced. This decomposition is catalytically accelerated by nitrosyl sulfate. The resulting sulfonamide reacts with the excess carboxylic acid, forming the amide of the carboxylic acid present and sulfuric acid, a reaction which we shall hereafter call "reamidification."

Reamidification is found to be particularly disadvantageous in the lactamisation of cyclohexane carboxylic acid or hexahydrobenzoic acid, because it is difficult to separate the lactam from the cyclohexane carboxylic acid amide formed by reamidification of the sulfonamide with excess hexahydrobenzoic acid.

The decomposition of caproimidyl sulfate is particularly pronounced when the lactamisation is carried out, as has already been proposed, in the presence of a heel consisting of the reacted mass, which serves as a diluent, and increases in proportion to the amount of recycled reacted mass and therefore of caproimidyl sulfate present in the reaction mass during the reaction itself.

It has now been found that the nitrosation of suitable cycloaliphatic compounds produces yields which are always constant and higher than 90% if the reaction is carried out in several successive stages, although none of the single stages involves the addition of more than 65% of the nitrosyl sulfate stoichiometrically required for the reaction to go to completion.

In order to carry out the reaction, the several successive stages are conducted in successive reaction zones. In the first stage of the reaction one introduces the total or almost total amount of organic substance containing the cyclohexyl ring—already appropriately mixed, depending on the original substance used, with sulfuric acid, with sulfuric acid containing $SO_3$; or with $SO_3$—and one adds only a part of the nitrosyl sulfate required, in quantities appropriately subdivided into the number of stages adopted.

It has been found convenient, for example, to operate in three stages, but it is also possible to operate with two, four, five or more stages. When the reaction is carried out in three stages, the preferred procedure is to introduce into the first reactor about one-third of the total required amount of nitrosyl sulfate, and an additional one-third into each following reactor. However, it is possible to adopt a method of subdivision other than subdividing the nitrosyl sulfate into thirds. For example, one may introduce 40% of the necessary nitrosyl sulfate into the first reactor and 30% into each following reactor, and a further subdivision may be applied by introducing, for example, 45–50% of the nitrosyl sulfate into the first reactor, 30–35% into the second reactor, and 20–25% into the third reactor, or, conversely, it is possible to introduce less than one-third of the nitrosyl sulfate in the first stage of the reaction and a corresponding amount greater than one-third in each following stage.

An analogous procedure is followed when the reaction is carried out in more or fewer than three stages.

The two-stage method has already been proposed and described in a previous patent held by the same applicant, but in that case the second reactor was used only to complete the nitrosation reaction, while when the new method of operation is used, each individual stage of the reaction should be considered an independent unit, and at the end of each stage all the nitrosyl sulfate introduced into the stage—or at least a high percentage of it—should have reacted in order to avoid the accumulation of nitrosyl sulfate in the following stages. The new method may also be applied in a manner analogous to the method already proposed, i.e., each individual stage may be provided with two reactors, one of which serves for the completion of the reaction.

The difference between the method proposed heretofore for the lactamisation of compounds containing the cyclohexyl ring with nitrosyl sulfate and the method based on the present invention consists, therefore, in the subdivision of the nitrosyl sulfate input into several streams which are added separately into each of the reactors, or else, of course, into different sections of a single reactor, in which the nitrosyl sulfate is made to go completely or almost completely into reaction, and also in the complete avoidance of any recycling of the caproimidyl sulfate already formed when, as has been stated, the reacted mass is used as a diluent.

The principle of avoiding any recycling of the reacted mass by introducing the nitrosation agent into different stages may be adopted, in general, for any nitrosation reaction, but the reaction conditions should be varied appropriately, depending on the compound to be nitrosated.

Of particular interest for industrial purposes are cyclohexane carboxylic acid, cyclohexane carboxylic acid anhydride, cyclohexyl phenyl ketone, and cyclohexyl tolyl ketone. The new mode of execution will be described in more detail on the basis compounds.

The lactamisation of cyclohexane carboxylic acid and of other cycloaliphatic carboxylic acids results in the formation of water, and since the presence of concentrated sulfuric acid is necessary for the regulation and continuous progress of the reaction, the lactamisation should be carried out in the presence of $SO_3$ or of sulfuric acid containing $SO_3$. For one mole of nitrosyl sulfate introduced, 0.6–0.7 moles of $SO_3$ are sufficient.

This amount of $SO_3$ is probably explained by the fact that 100% sulfuric still dissociates partly into $H_2S_2O_7$ and water, so that the reaction can take place until the pyrosulfuric acid is completely or almost completely consumed i.e., until a sulfuric acid concentration of 98–99% is achieved.

From the studies carried out on the kinetics of the reaction, it has been found that the reaction rate constant does not depend on the concentration of the nitrosyl sulfate but is a function of the amount of $SO_3$ contained in the solution and of the concentration of the sulfuric acid. Since one mole of water is formed for each mole of nitrosyl sulfate that has reacted, a reaction—carried out in each individual stage under the same conditions—always becomes slower as the amount of $SO_3$ present is reduced, because of the water that is formed.

If the reaction takes place, as described above, in the presence of the reacted mass and if the necessary amounts of carboxylic acids, oleum, and nitrosyl sulfate are continuously fed into the reactor, a moderate and constant reaction rate is obtained.

The subdivision of the nitrosation reaction into several stages has the special advantage of making it possible to eliminate the high heat of reaction very easily and to calculate and maintain the desired temperature and residence time in each individual stage, bearing in mind the fact that the reaction always become slower with the reduction in the amount of $SO_3$ in the reaction mass.

If the total or almost total amount of $SO_3$—e.g., in the form of pure $SO_3$ or as oleum with 20–60% $SO_3$—and the organic substance are introduced in the first stage, this stage will have the highest reaction rate and therefore the shortest residence time. Since the elimination of the heat of reaction—if, for example, the nitrosating agent is divided into three equal parts—is more difficult under these conditions, it is desirable to introduce the reagents into the first stage at ambient temperature or a slightly higher temperature. Part of the heat of reaction is used up in raising the reagents to the reaction temperature preferred for carrying out the reaction in this stage, i.e., 60–100° C.

The amount of heat—about 45 kcal. per mole—generated during the reaction is nevertheless greater than is required to raise the reagents to the reaction temperature, and therefore other means must be provided for removing the heat so that the desired temperature may be maintained at a constant level. To this end, one may operate according to already known methods, e.g., in the presence of cyclohexane or some other substance which is inert with respect to the reaction and whose heat of vaporization will eliminate the excess heat. However, it is more advantageous to use a heat exchanger whose cooling surface area can easily be calculated on the basis of the residence time and of the amount of heat to be removed. Since the reaction rate, and hence the heat generation per unit of time, is high in the first stage, the coolant must be fed into the heat exchanger at low temperature. The reaction temperature can be controlled easily either by regulating the temperature of the coolant or by varying its rate of flow.

In the following stages it is necessary to remove, by means of the coolant, all of the heat generated during the reaction, or almost all of that heat in the case where provision has been made for intermediate cooling of the reaction product, e.g., by about 10° C. As the amount of $SO_3$ present is reduced, the reaction rate at constant temperature decreases according to a law which is not linear but instead is accelerated and almost exponential, and therefore, when the method is applied in practice, the residence time in each stage should be almost double the time in the preceding stage. The reaction rate increases with increasing temperature according to a similar law. When the operation is carried out in three stages, with a division of the nitrosyl sulfate into three almost equal parts and the introduction of the total or almost total amount of $SO_3$ together with the organic substance at the beginning of the first stage, the ratios between the residence times, are of the order of 1:1.5–2:4. As a result of the increased reaction rate that can be achieved by increasing the temperature, it is possible to operate in the second and third stages with shorter residence times and at higher temperatures. For example, residence times in the ratio of 1:1.3:2 are obtained if the temperature is regulated at 76° in the first stage, 82° in the second stage, and 88–90° C. in the third stage.

When heat exchangers are used for removing the heat of reaction, the reduction in reaction rate must be taken into account by keeping the surface of each heat exchanger at a temperature higher than in the preceding stage. If the heat exchanger surface temperature and the reaction rate are too low, there is a danger that the reaction will not go to completion or will be prevented from taking place at all. The best method for regulating the surface temperature of each heat exchanger is to preheat the coolant, before sending it through the heat exchanger, to a temperature assigned on the basis of the temperature in the stage itself. Thus, for example, the coolant used may be water which leaves the first stage at a temperature of about 50–60° and not less than 20°, leaves the second about 55–65° and not less than 30°, and finally, leaves the third stage at about 70–80° and not less than 60°. When more or fewer than three stages are used, an analogous procedure is used.

Instead of introducing all of the $SO_3$—in the form of pure $SO_3$ or of oleum—at the beginning of the process, $SO_3$ may also be added to the nitrosyl sulfate, or pure $SO_3$ or oleum may be added, preferably at high concentration, to the reaction mass in the following stages before the introduction of the nitrosyl sulfate. Moreover, it is possible to vary the amount of $SO_3$ added to the nitrosyl sulfate in the individual stages by increasing or decreasing, at the beginning or at the end, the amount of $SO_3$ added to the nitrosyl sulfate. The most expedient amount of $SO_3$ added, calculated on the basis of the nitrosyl sulfate introduced into the reaction, is about 0.7 mole in each case. Finally, especially in the last stage or stages, one may introduce more cyclohexane carboxylic acid or a mixture of cyclohexane carboxylic acid and oleum, or also a ketone, e.g., dicyclohexyl ketone.

Thus, the procedure admits of many variants.

As has already been described in previous patents held by applicants' assignee, operation in the lactamisation of cyclohexyl carboxylic acid and of other cycloaliphatic carboxylic acids are carried out with an excess of acid with respect to the NO+ ions introduced, and the amounts generally used are, e.g., 1.6–2.2 moles of hexahydrobenzoic acid per mole of nitrosyl sulfate. These excesses of cyclohexane carboxylic acid may be replaced, at least partially, by benzoic acid without thereby reducing the yield, and one may, for example, use 1.2–1.3 moles of cyclohexane carboxylic acid and .06–.8 mole of benzoic acid, but this does not generally represent a preferred method because it is more complicated to recover the excess of benzoic acid from the mixture than the excess of hexahydrobenzoic acid.

For the lactamisation of ketones, and hence, e.g., of cyclohexyl phenyl ketone, cyclohexyl tolyl ketone, or aliphatic or aromatic cycloaliphatic ketones, there is generally no need either for $SO_3$ or for an excess of ketone, although the reaction can also be carried out in the presence of $SO_3$.

With regard to the conditions of lactamisation, cyclohexane carboxylic acid anhydride may be compared to ketones. It is expedient to use one mole of anhydride per mole of nitrosyl sulfate; the reaction takes place in the presence of sulfuric acid alone, and one mole of cyclohexane carboxylic acid is recovered.

Whereas optimum yields in the lactamisation of acids require a total amount (i.e., including the sulfuric acid of the nitrosyl sulfate) of about 3.5–3.6 moles of sulfuric acid—consisting of 2.9 moles of sulfuric acid and 0.7 mole of $SO_3$—the lactamisation of ketones, on the other hand, requires only about 2–2.2 moles of sulfuric acid (still including the sulfuric acid contained in the nitrosyl sulfate).

For lactamisation of ketones and of cyclohexane carboxylic acid anhydride, therefore, unlike the case of acids, one does not introduce into the apparatus a mixture of the cycloaliphatic acid with $SO_3$ or sulfuric acid containing $SO_3$ but introduces only the ketone or a ketone-sulfuric acid mixture containing sulfuric acid only in small amounts. Using the normal mixture of nitrosyl sulfate and sulfuric acid containing 55% nitrosyl sulfate, we may add to the ketone, for example, 0.2 mole of sulfuric acid per mole of ketone.

In view of the fact that no water is formed in the lactamisation of the ketones and the hexahydrobenzoic acid anhydride, there is no consumption of $SO_3$. Consequently, the reaction rate varies only slightly during the reaction. It is therefore possible to keep the temperatures, the residence times, and the coolant almost uniform in the various stages of the reaction. It is also advisable, for example in the lactamisation of the ketones, to work with more than three stages, keeping the temperature and the coolant almost unchanged in each individual stage.

This new mode of execution of the lactamisation process subdivided into several stages has yielded the same good results as were obtained in the lactamisation of cyclohexane carboxylic acid. With regard to the lactamisation of ketones, there are not the same special advantages as the method offers in the lactamisation of hexahydrobenzoic acid, since in the case of ketones, yields of more than 90% are obtained even with the already known methods, i.e. when the heel consisting of the reacted mass is used. Nevertheless, this new method of execution makes it possible, even in the case of ketones, to obtain a pure lactam and a yield which is always about 95% of the theoretical value calculated on the basis of the ketone brought into reaction.

The procedure will be illustrated by means of the following non-restrictive examples, which relate to the attached sketches, in which schematic diagrams are given of apparatuses which may be used for the execution of the procedure in accordance with the invention.

*Example 1*

The equipment used consists of a sequence of three flasks which function as reactors. The flasks are equipped with an agitator, a thermometer, and separating funnels and are connected to one another by means of tubes. The last flask is subjected to a vacuum in order to ensure a constant flow of the reaction mass from one reactor to another.

To start the process, a mixture of cyclohexane carboxylic acid and oleum containing 40% $SO_3$, at a rate of 15 g./min. (11.1 g. of cyclohexane carboxylic acid plus 3.9 g. of 40% oleum per minute), and a solution of $NOHSO_4$ in oleum at the rate of 3.75 g./min., respectively, are fed into the first reactor through two separatory funnels. (This solution consists of 46.49% nitrosyl sulfate, 44.3% sulfuric acid, and 9.2% $SO_3$, and the amount of $NOHSO_4$ fed into the first reactor is equal to one-third of the total to be brought into reaction.) The total amount of reagents fed in is found to be 18.75 g./min.

A constant mass of 50 g. is maintained in the reactor during the entire reaction time, so that the residence time is 2′40″. The reaction temperature is regulated at 77° C., cooled from outside by a bath maintained at 60° C.

When the predetermined level has been reached in the first reactor, the mass begins to be transferred from the first to the second reactor through a tube, and at the same time a solution of $NOHSO_4$ in oleum equal to one-third of the total amount of $NOHSO_4$ to be brought into reaction is fed into the second reactor dropwise at the rate of 3.75 g./min.

During the entire reaction time a constant mass of 60 g. is maintained in the reactor, so that the residence time is 2′40″. The reaction temperature is regulated at 82° C., the external cooling being kept at 68° C.

The last one-third of the $NOHSO_4$ required to bring the reaction to completion is fed into the last reactor (at a rate of 3.75 g./min.).

A constant mass of 131 g. is maintained in the reactor, so that the residence time is 5 min.

The reaction temperature is regulated at 88° C. by external cooling with a bath maintained at 78° C.

The mass is discharged continuously through a cooler into a container which is cooled externally with water and into which 2.5 g. of $H_2O$ per minute are fed dropwise, so as to bring the concentration of sulfuric acid to about 80%. The purpose of this is to prevent any reamidification reaction.

The flow of the reagents is halted after two hours, at which time the amounts that have been fed in are 1332 g. of hexahydrobenzoic acid, 468 g. of 40% oleum, and 1350 g. of a solution of $NOHSO_4$ in oleum consisting of 46/49% $NHSO_4$, 44.3% sulfuric acid, and 9.2% $SO_3$.

In order to determine the yield, at the end of the reaction the mass remaining in each reactor is also discharged into the container. The weight of the total mass, including the $H_2O$ added, is 3225 g.

A 200-g. sample is poured over ice, alkalized with NaOH, and extracted with $CHCl_3$. Evaporation of the solvent yields 31.67 g. of caprolactam, which is 92% of the theoretical value calculated on the basis the $NOHSO_4$ fed in.

The alkaline mass is acidified with HCl and extracted with ether. After the evaporation of the solvent, 44.45 g. of hexahydrobenzoic acid are obtained (yield=93.8%).

Analysis shows that the hexahydrobenzoic acid is 99% pure. The caprolactam contains 0.63% hexahydro benzamide and is found, by a Kjeldahl nitrogen determination, to be 98% pure.

The value of 98% is calculated after subtraction of the $N_2$ corresponding to the amides present.

In a second test the first reactor is charged simultaneously with a mixture of hexahydrobenzoic acid and oleum containing 30% $SO_3$, at a rate of 15 g./min. (10.75 g. of hexahydrobenzoic acid and 4.3 g. of 30% oleum) and a solution of nitrosyl sulfate in oleum consisting of 46.745% nitrosyl sulfate, 43.976% sulfuric acid, and 9.286% $SO_3$.

The amount of nitrosyl sulfate fed into each of the three reactors is equal to one-third of the total to be brought into reaction; the input rate is 3.775 g./min.

The operation is carried out with the same residence times as in the previous test. The reaction temperature in the first reactor is maintained at 77° C., with external cooling at 60° C., that in the second reactor is maintained at 82° C. with external cooling at 68° C., and that in the third reactor is regulated at 88° C. by means of an external bath maintained at 78° C.

The flow of the reagents is halted after two hours, when 1.799 g. of a mixture of hexahydrobenzoic acid with 30% oleum (1285 g. of hexahydrobenzoic acid+514 g. of 30% oleum) and 1360 g. of nitrosyl sulfate solution have been fed in. The total amount discharged is 2947 g.

The lactam yield is determined from the 200-g. sample: the amount of caprolactam obtained is 34.85 g., equal to 91% calculated on the basis of the NO and 92.5% calculated on the basis of the hexahydrobenzoic acid, of which 45 g. are recovered. The caprolactam contains 0.6% hexahydro benzamide and is found to be 98.2% pure.

In the third test, the first reactor is charged simultaneously with a mixture of oleum containing 30% $SO_3$ with hexahydrobenzoic acid at a rate of 15 g./min. (10.7 g. of hexahydrobenzoic acid+4.3 g. of 30% oleum) and a solution of nitrosyl sulfate in oleum consisting of 46.745% nitrosyl sulfate, 43.976% sulfuric acid, and 9.286% $SO_3$. An amount of nitrosyl sulfate equal to 50% of the total amount to be brought into the reaction is fed into the first reactor at an input rate of 5.67 g./min.

The second and third reactors are each charged with 25% of the total nitrosyl sulfate, at a rate of 2.83 g./min. The following conditions are maintained throughout the reaction: a constant amount of 75 g. in first reactor, 78.5 in the second reactor, and 132 g. in the third reactor, so that the residence times are 3'40" in the first and second reactors and 5 min. in the third reactor.

The reaction temperature is maintained in the first reactor at 75° C. by external cooling at 53° C., in the second reactor at 85° C. by an external bath maintained at 70° C., and in the third reactor at 89° C. by an external bath regulated at 80° C.

The flow of the reagents is halted after two hours, when the amounts that have been fed in are 1800 g. of a mixture of hexahydrobenzoic acid with 30% oleum and 1360 g. of a solution of nitrosyl sulfate in oleum.

The total discharge amounts to 2945 g.

The lactam yield is determined from a 200-g. sample. The caprolactam obtained is 35.15 g., equal to a yield of 91.5% calculated on the basis of the NO and to 93.4% calculated on the basis of the hexahydrobenzoic acid, of which 44.6 g. are recovered.

The caprolactam contains 0.67% hexahydro benzamide. Analysis indicates that the hexahydrobenzoic acid is 98.3% pure, and the caprolactam 97.8% pure.

A fourth test uses an apparatus which is identical with the preceding except that it includes a fourth flask which also acts as a reactor. The first reactor is charged with a mixture of benzoic acid+30% oleum at a rate of 15 g./min. (10.7 g. of hexahydrobenzoic acid and 4.3 g. of 30% oleum) and a solution of nitrosyl sulfate in oleum, consisting of 46.75% nitrosyl sulfate, 43.976% sulfuric acid and 9.286% $SO_3$. The amount of nitrosyl sulfate fed into each of the four reactors is 25% of the total amount to be brought into reaction.

The conditions maintained throughout the reaction are: in the first reactor, a constant amount of 41.5 g., in the second an amount equal to 55 g., in the third reactor an amount equal to 82 g., and in the fourth reactor an amount equal to 132 g., so that the residence time in the first reactor is 2'20", the residence time in the second reactor is 2'40", the residence time in the third reactor is 3'30", and the residence time in the fourth reactor is 5 min. The temperature in the first reactor is maintained at 77° C. by external cooling at 64° C., in the second reactor at 81° C. by cooling at 68° C., in the third reactor at 85° C. with external cooling regulated at 75° C., and in the fourth reactor at 90° C. with external cooling at 80° C. The flow of the reagents is halted after two hours.

The total amount fed in has been 1300 g. of a mixture of hexahydrobenzoic acid and 30% oleum (1285 g. of hexahydrobenzoic acid+515 g. of 30% oleum), and 1360 g. of a solution of nitrosyl sulfate in oleum. The total discharge weighs 2946.5 g.

The lactam yield is determined from a 200-g. sample. The amount of lactam obtained is 35.4 g., equal to 92.3% calculated on the basis of the NO and 94.2% calculated on the basis of the hexahydrobenzoic acid, of which 44.7 g. are recovered.

We give below a number of other examples in which the nitrosyl sulfate has been fed into the various stages with an equal quantitative distribution in each stage. However, such a distribution and subdivision can be effected in different ratios, as indicated at the beginning, within the critical limits of the invention, with appropriate variations in the conditions of the heat exchanges.

*Example 2*

The apparatus used is of the kind shown in FIG. 1, consisting of a cylindrical reactor 9 made of stainless steel, having an inner diameter of 80 mm., equipped with cooling jackets, and subdivided into four compartments by means of separating plates which contain a central hole 30 mm. in diameter, and of a product residence compartment CS.

The heights of the stages, starting with the bottom stage, are, respectively, 40 mm. ($R_1$), 72 mm. ($R_2$), and 88 mm. ($R_3$). Each compartment is equipped with a thermometer (TI). Four antisloshing baffles 8 mm. wide (not shown in the sketch) are arranged on the walls of each reaction stage, and $R_1$ contains six coils of stainless steel tubing with an outer diameter of 6 mm., arranged in two banks of three coils each, with average diameters of 58 mm. and 38 mm. (total cooling surface equal to 276 cm.$^2$); $R_2$ contains six coils of same type of tubing with an average diameter of 58 mm. (total cooling surface 375 cm.$^2$); $R_3$ contains eight coils of the same type of tubing, with an average diameter of 58 mm. (total cooling surface 480 cm.$^2$). The heat of reaction is removed by the circulation of thermostated water, which is fed through the appropriate coils and the cooling jackets arranged in the individual stages of the reactor.

A turbine agitator A situated at the center of the reactor rotates at 3000 r.p.m. and is equipped with rotors (with four flat blades) 28 mm. in diameter, arranged at the center of each reaction stage; situated above the first three rotors, are the inlet tubes for the nitrosyl sulfate $NS_1$, $NS_2$, $NS_3$, which is brought into the reactor by means of a three-headed piston pump 8.

In addition to the storage tanks 1, 7, 5, the apparatus includes a mixer for preparing the mixture—cyclohexane carboxylic acid plus oleum—consisting of two tanks 2A and 2B, each with a capacity of 3 liters, a cooling coil S (surface=0.10 m.$^2$), outside which water circulates at 25° C., and a gear-type recycling pump 3, with a capacity of 100 liters/hour.

The preparation of the mixture of hexahydrobenzoic acid plus oleum is carried out by charging the tank 2A with 2040 g. of hexahydrobenzoic acid (melting point 30–31° C.) taken from storage tank 1, which is kept at a temperature of 50° C.

The hexahydrobenzoic acid is circulated by means of pump 3 through the cooling coil S for 2 min., and then pump 4 is used, by aspiration from pump 3 for 45 min. to feed 833 g. of 40% oleum contained in storage tank 5, maintained at a temperature of 50° C., continuing to recycle the mass (hexahydrobenzoic acid plus oleum) through the coil S.

The temperature at the inlet to the cooling coil S is stabilized at 36° C. and is down to 32° C. at the outlet of the coil.

After the hexahydrobenzoic acid and the oleum have been completely mixed in 2A, the reaction is started by using a dosing pump 6 to pump 2873 g./hour of mixture into the lower stage of the reactor $R_1$.

At the same time the subsequent preparation of the mixture of hexahydrobenzoic acid and oleum is begun, in the above-described manner, in tank 2B. This preparation is repeated alternately in 2A and 2B every 45 min.

After 400 g. of the mixture of hexahydrobenzoic acid plus oleum have been brought into the first stage of the reactor $R_1$, the pump 8 (Branch I) is used to feed the solution of nitrosyl sulfate in oleum at the rate of 840.6 g./hour (3.075 moles of NO+), which has been brought from the storage tank 7 maintained at a temperature of 60° C. The solution of nitrosyl sulfate in oleum consists of a 48.3% solution of $NOHSO_4$ in $H_2O$, to which 3.78% (by weight) of $SO_3$ is added.

The reaction temperature in this stage is maintained at 76° C., while the cooling water is thermostated at a temperature of 68° C.

The residence time of the reaction mass in $R_1$ is 2 min. (useful volume of the stage=200 cm.$^3$, average specific gravity of the reacting mass 0.8 gr./cm.$^3$). After the introduction of an additional 400 g. of mixture of hexahydrobenzoic acid plus oleum, the nitrosyl sulfate is brought by means of pump 8 (head II) into the second stage of the reactor $R_2$ at a flow rate of 840.6 g./hour (3.075 moles of NO+). The reaction temperature in this stage is maintained at 81° C., and the cooling water is thermostated at 73° C.

The residence time of the reaction mass in $R_2$ is 3′30″ (useful volume of the stage=360 cm.$^3$).

When the second stage is completely in operation, nitrosyl sulfate is pumped by means of pump 8 (head III) into the third stage of the reactor $R_3$, at a flow rate equal to the preceding values.

The reaction temperature is maintained at 86° C., and the cooling water is thermostated at 81° C.

The residence time of the mass in the stage is 4′30″ (useful volume of the stage=440 cm.$^3$).

The reacted mass remains in the residence compartment of the reactor CS—which also contains a cooling coil with water circulation—for 5 min., and it leaves the discharge tube together with the reaction gas which is separated from the liquid in the collecting vesel 10 maintained at a temperature of 10° C. by the circulation of brine at 2° C.

The constant flow of the reagents and the rapid agitation of the reaction mass make it possible to shift the mass from the bottom to the top of the reactor, preventing any intermixing of the product between the various stages. The flow of the agents is halted after 24 hours, not counting the first hour required to bring the apparatus into operation.

The total quantity of reagents charged during this time is 129.475 kg. (molar ratio of hexahydrobenzoic acid to NO′=1.727:1, $H_2SO_4$/NO′=3.511:1, $$SO_3/NO'=0.5806:1)$$

and the amount of material discharged is 118.534 kg.

Homogeneous samples (1000 g.) of the discharged product are analyzed after dilution with $H_2O$ under cooling. The mass is alkalized with NaOH to pH of 9 and extracted with $CHCl_3$. The chloroform, evaporated in a water bath under a vacuum, leaves a bright yellow residue consisting of caprolactam.

The alkaline aqueous solution is acidified with HCl and extracted with ether.

The evaporated ether leaves a residue of hexahydrobenzoic acid.

From the various samples taken from the discharged mass, the following average percentages of caprolactam and hexahydrobenzoic acid have been obtained:

| | Percent |
|---|---|
| Hexahydrobenzoic acid | 17.86 |
| Caprolactam | 19.42 |

Consequently, the total amount of caprolactam produced during the test has been 23.06 kg., and the amount of hexahydrobenzoic acid recovered has been 21.170 kg.

The yields of the reaction are found to be the following:

caprolactam yield in proportion to hexahydrobenzoic acid=93.82%, caprolactam yield in proportion to nitrosyl sulfate =92.00%.

The caprolactam so obtained is 98.2% pure.

The by-products (1.8%) contained in the caprolactam consist of hexahydro benzamide (0.55%) and high-boiling products (1.25%) obtained as a residue from the distillation of the caprolactam.

A test carried out in a cylindrical reactor similar to that described in the example and divided into 12 compartments (four for each stage), which had a production capacity ten times as high as that of the reactor in the example described and into which 20.400 kg./h. of hexahydrobenzoic acid, 8.330 kg./h. of 40% $SO_3$, and 25.218 kg./h. of nitrosyl sulfate solution in oleum with 3.78% $SO_3$ were charged, produced caprolactam yields of 94.1% in proportion to the reacted hexahydrobenzoic acid and 93.5% in proportion to the $NOHSO_4$, respectively.

The nitrosyl sulfuric acid was always fed in three equal fractions (as in the example described) and at distances (measured from the bottom of the reactor) proportional to the reaction times required.

*Example 3*

The complete apparatus shown in FIG. 2 consists of three separate tanks for the storage of cyclohexane carboxylic acid, oleum, and nitrosyl sulfate, respectively 21–22–23 (the tanks are jacketed and maintained at a temperature of 35° C.), a mixer equipped with an internal cooling coil for the preparation of the mixture of oleum and hexahydrobenzoic acid 24, three reactors $R_1$–$R_2$–$R_3$ for complete mixing arranged in cascade, three tanks $T_1$–$T_2$–$T_3$ thermostated by the cooling water of the three reactors, and a vessel for collecting the discharge S–R. The first reactor $R_1$ consists of a cylindrical stainless steel vessel 140 mm. in diameter and 350 mm. high, with a flanged cover and a degassing tube for the $CO_2$.

The vertical agitator 25 is equipped with a six-bladed rotor at a distance of 40 mm. from the bottom of the reactor.

A double coil of stainless steel with an inner diameter of 12 mm. and an outer diameter of 14 mm., with 2.5 turns 120 mm. in diameter and 2.5 turns 85 mm. in diameter, is set up inside; the cooling water circulates in this coil.

The product is discharged through an overflow pipe 26 whose height can be regulated so as to permit a variation in the amount of the mixture contained in the reactor.

The reaction temperature is checked by means of a thermocouple TC. A side window (not shown the sketch) makes it possible to check the level of the reacting mass.

The second reactor $R_2$ is similar to the first, with the following dimensions: 140 mm. in diameter, 460 mm. high, agitator 27 with three rotors, an inner cooling coil 12 mm. in inner diameter and 14 mm. in outer diameter, with seven turns 85 mm. in diameter and 7 turns 120 mm. in diameter. The temperature is checked by means of a thermocouple TC.

The discharge is carried out by means of an adjustable overflow pipe 8, and the level of the mass can be checked by means of a window not shown in the sketch.

The third reactor $R_3$ is 140 mm. in diameter, with a total height of 690 mm., and has an agitator 29 with three rotors, as well as a cooling coil 12 mm. in inner diameter and 14 mm., in outer diameter, with double turns side by side, 10 turns having a diameter of 85 mm. and 10 turns having a diameter of 120 mm.

The reacted product is discharged through the overflow pipe 30, whose height can be regulated.

The input to the mixer 24 is 5690 g./hour of oleum containing 40% $SO_3$ (34.836 moles of $H_2SO_4$ and 28.45 moles of $SO_3$) and 11,400 g./hour of hexahydrobenzoic acid (89.06 moles).

The temperature is maintained at 38° C. during the mixing, and is checked by means of the thermocouple TC.

The gear pump P4 draws 17,090 g./hour of mixture from the mixer 24 and pumps it through a lined tube into the first reactor $R_1$.

At the inlet to the first reactor, the mixture is at a temperature of 30° C., and in the reactor itself it is heated to 75° C. by means of the coil, in which water is circulating at 80° C.

After 10 min., the piston-type dosing pump P1 begins to feed the nitrosyl sulfate in the form of a solution in oleum, at the rate of 3900 g./hour ($H_2SO_4$ at 1816.3 g./hour=18.523 moles/hour; $SO_3$ at 200 g./hour=2.5 moles/hour; $NOHSO_4$ at 1883.7 g./hour=14.832 moles/hour).

The reaction temperature is maintained at 78° C., with the cooling water thermostated in the tank T1 at 63° C.

A large amount of gas is generated during the reaction. From the outlet 26 situated 100 mm. from the bottom of the reactor, the reacted product is discharged and transferred to the second reactor $R_2$.

The residence time in the first reactor is 173 sec. (apparent density of the reacting mass=0.7 g./cm.$^3$, volume occupied by the reacting mass=1392 cm.$^3$. The heat of reaction is 320 kcal./hour; the cooling surface is 710 cm.$^2$).

The tube bringing the reacted product into the second reactor is jacketed for one meter of its length, and water at 50° C. circulates in the jacket. The temperature of the mass drops to 70° C., and it enters the second reactor at this temperature.

After 15 min., the piston pump P2 begins to pump the nitrosyl sulfate into $R_2$, the exact rate being 3900 g./hour, with the following composition: 1816.3 g./hour of $H_2SO_4$, 200 g./hour of $SO_3$, and 1883.7 g./hour of $NOHSO_4$.

The reaction temperature is maintained at 82° C., with cooling water at 70° C.

The reaction temperature is completely monitored by means of the water coming from the tank T2.

The reacted product is discharged regularly and continuously from the outlet 28 situated at a height of 160 mm.

The reaction time is 190 sec. (volume occupied by the reacting mass=1765 cm.$^3$. The heat of reaction is 600 kcal./hour, and the cooling surface is 2000 cm.$^2$).

From the second reactor $R_2$ the reacted mass is transferred without cooling into the third reactor $R_3$, entering it at a temperature of 80° C. After 25 min., the regulated piston pump P3 begins to draw the nitrosyl sulfate from the storage tank 23 and pump it into the third reactor at a rate of 3900 g./hour.

The reaction temperature is maintained at 85° C., with cooling water at 76° C. coming from the thermostated tank T3. The reaction time is 258 sec.

The outlet is situated 240 mm. above the bottom of the reactor $R_3$ (volume occupied by the reaction mass=2710 cm.$^3$. The heat of reaction of 600 kcal./hour. The cooling surface is more than 2000 cm.$^2$).

The reacted product leaves by way of the discharge overflow pipe 30 and is transferred, through a jacketed pipe in which cold water is circulating, to the collecting vessel 53 (SR).

After one hour the apparatus is in full operation.

The test lasted 24 hours with the apparatus in full operation. The amount charged during this time with ratio of hexahydrobenzoic acid to nitrosyl sulfate=2:1; sulfuric acid to nitrosyl sulfate=3.84:1; $SO_3$/nitrosyl sulfate =0.806:1, amounted to 690.960 kg. of reagents, and the amount discharged was 644.421 kg. of reacted product.

Analysis of the discharged mass (carried out as in Example 2) showed the following composition for the reacted mass:

| | Percent |
|---|---|
| Unconsumed cyclohexane carboxylic acid | 26.61 |
| Caprolactam | 17.36 |

The total amount of caprolactam produced during the test was 111.867 kg., and the amount of hexahydrobenzoic acid recovered was 139.257 kg. The reaction yields are therefore found to be the following:

Caprolactam yield calculated on the basis of the hexahydrobenzoic acid consumed: 94.3%; calculated on the basis of the nitrosyl sulfate: 92.7%. The caprolactam obtained is 97.8% pure.

The by-products (2.2%) consist of hexahydro benzamide (0.65%) and high-boiling by-products (1.55%), obtained as a residue from the distillation of the caprolactam.

*Example 4*

Figure 3:
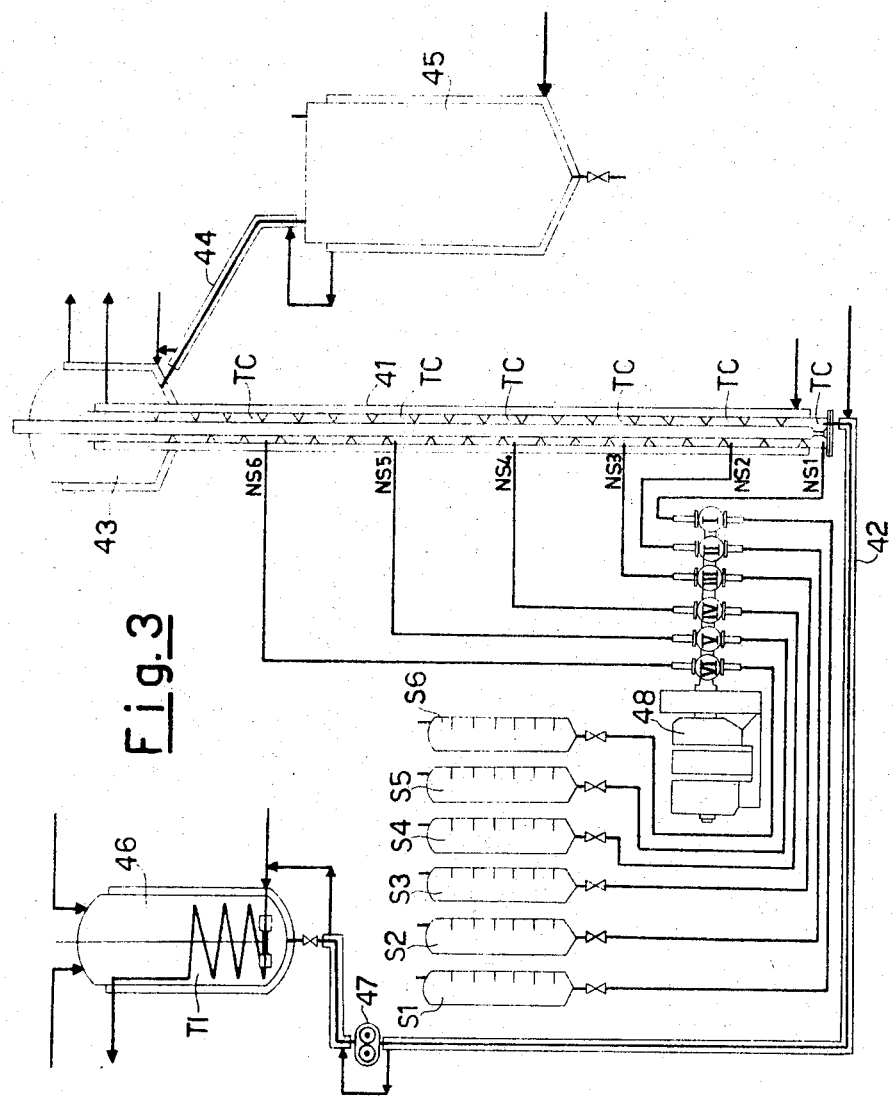

The reaction is carried out in a reactor such as is shown schematically in FIG. 3, made of stainless steel (screw type, with inclined blades, 41). This consists of a vertical cylindrical tube 30 mm. in inner diameter and 750 mm. high, constituting the body of the reactor; the tube is jacketed, and cooling water at a temperature of 40° C. circulates inside the jacket.

The inclined-bladed screw (pitch=20 mm.) is mounted on a shaft 15 mm. in diameter coaxial with the axis of the reactor.

At the bottom of the reactor is the inlet tube 42 for the mixture of cyclohexyl phenyl ketone and 96% sulfuric acid; laterally arranged along the side of the reactor are six tubes ($NS_1$–$NS_2$–$NS_3$–$NS_4$–$NS_5$–$NS_6$) for the inlet of the nitrosyl sulfate, placed 0.3, 10, 21, 33, 46, and 60 mm. respectively, from the bottom of the reactor.

Six thermocouples TC facing the nitrosyl sulfate inlet are used for monitoring the temperature.

The reactor is also equipped with a motor for turning the screw (rotation speed=150 r.p.m.).

The reacted product which overflows at the top of the reaction tube is collected in a chamber 43 with jacketed walls, which are maintained at 80° C. by means of circulating water, and is discharged, through a jacketed collector 44 maintained at 80° C., into the collecting vessel 45. The mixer 46, which has a capacity of 5 liters and is equipped with an insulating mantle, an agitator, and a coil with water thermostated at 55° C. circulating in it, is continuously charged with 2500 g./hour (13.298 moles/hour) of cyclohexyl phenyl ketone (melting point 54°–55° C.) and 260.5 g./hour of 96% sulfuric acid (2.551 moles/hour of sulfuric acid) (molecular ratio of cyclohexyl phenyl ketone to sulfuric acid=5.213:1).

The temperature of the mass during the mixing of the cyclohexyl phenyl ketone with the 96% sulfuric acid is stabilized at 60° C.

After 20 min. the reaction is begun by using the gear pump 47 to feed 2760 g./hour of a mixture of cyclohexyl phenyl ketone and sulfuric acid into the bottom of the reactor.

At the same time, using the first head of the piston pump 48, $NS_1$ is charged with 620 g./hour of a solution of nitrosyl sulfuric acid in sulfuric acid (92.5% calculated on the basis of the free sulfuric acid) (285.75 g./hour of $NOHSO_4$=2.23 moles per hour; 309.42 g./hour of $H_2SO_4$=3.157 moles per hour; 24.83 g./hour of $H_2O$=1.379 moles per hour) contained in the tank $S_1$, equipped with a graduated level-indicator.

The temperature of the water in the reactor jacket during the priming phase is maintained at 75° C.

The difference in height between $NS_1$ and $NS_2$ is 9.7 cm. The residence time is 1′07″.

The reaction temperature in this section is 92° C.; the cooling water is thermostated at 40° C. in the entire reactor jacket. After 2 min., the second head of the piston pump 48 is used to pump into $NS_2$ (situated 10 cm. above the bottom of the reactor) 620 g./hour of a solution of nitrosyl sulfuric acid of the above-specified composition, taken from tank $S_2$, with a capacity of 2 liters (equipped with a graduated level-indicator).

The difference in height between $NS_2$ and $NS_3$ is 11 cm.; the residence time is 1'07". The reactor temperature is 92° C.

After 4 min., the third head of the pump 48 is used to charge $NS_3$ with the nitrosyl sulfate (620 g./hour) drawn from the tank $S_3$ (capacity 2 liters).

The difference in height between $NS_3$ and $NS_4$ is 12 cm., the residence time is 1'07", and the reaction temperature is 92° C.

After 6 min., the fourth head of the pump 48 is used to charge $NS_4$ with the nitrosyl sulfate (620 g./hour) drawn from the tank $S_4$ (capacity 2 liters).

The difference in height between $NS_4$ and $NS_5$ is 13 cm., the residence time is 1'07", and the reaction temperature is 92° C.

After 8 min., the fifth head of the pump 48 is used to charge $NS_5$ with the nitrosyl sulfate (620 g./hour) taken from the tank $S_5$ (capacity 2 liters).

The distance between $NS_5$ and $NS_6$ is 14 cm., the residence time is 1'07", and the reaction temperature is 92° C.

After 10 min., the sixth head of the pump 48 is used to charge $NS_6$ with the nitrosyl sulfate (620 g./hour) taken from the tank $S_6$. The distance between $NS_6$ and the outlet is 15 cm., the residence time is 1'07", and the reaction temperature is 92° C.

At the end of the reaction, the product overflow into the collecting chamber 43, which is jacketed and maintained at 80° C. (in order to prevent solidification of the benzoic acid obtained as a coproduct of the reaction), and from this, through the header 44, it passes into the collecting vessel 45.

The test took a total of 10 hours. Excluding the first hour of the reaction, required to bring the apparatus into full operation, the input into the reactor has amounted to 64.806 kg. of reagents (molar ratio of cyclohexyl phenyl ketone to NO+=0.985:1; $H_2SO_4$ to NO+=2.592:1), and the amount discharged has been 64.430 kg.

Homogeneous samples consisting of 100 g. of reacted product, taken every hour, are analyzed.

The analysis is carried out by hydrolyzing the reacted mass with ice. In this way the benzoic acid is separated as a pale yellow solid, which is extracted with ether. By evaporation of the ether solution, the benzoic acid is obtained as a spongy mass.

The aqueous phase, after extraction of the benzoic acid with ether, is alkalized to a pH of 9 with an NaOH solution and extracted with $CHCl_3$. The caprolactam is obtained as a residue from the evaporation of the chloroform.

For each 100-g. sample analyzed, the following average percentages of benzoic acid and caprolactam were obtained:

| | Percent |
|---|---|
| Benzoic acid | 24.7 |
| Caprolactam | 22.7 |

Consequently, the total amount of caprolactam is 14.65 kg. and the total amount of benzoic acid is 15.914 kg.

The caprolactam yield calculated on the basis of the ketone charged into the apparatus is found to be 97.5% and the yield calculated on the basis of the nitrosyl sulfate input is 95.86%.

The benzoic acid yield, expressed as a percentage of the ketone, is 98.3%.

The benzoic acid is 98% pure (determined by distillation). The caprolactam is 98.4% pure.

The impurities in the caprolactam (1.6%) consist of benzamide (0.4%) and high-boiling by-products.

The embodiments of the invention in which an exclusive property or privilege is claimed are defined as follows:

1. In a process for production of caprolactam by reaction between a nitrosating agent and at least one cyclohexanoyl compound selected from the group consisting of hexahydrobenzoic acid, derivatives thereof hydrolyzable thereto, and ketones wherein a cyclohexane ring is attached to the carbonyl group of the ketone, in the presence of at least one member selected from the group consisting of sulfur trioxide and sulfuric acid, the improvement which comprises providing a plurality of reaction zones, feeding the cyclohexanoyl compound into the first of said reaction zones, feeding into said first zone a nitrosating agent in an amount not exceeding 65% by weight of the overall amount fed into all of the reaction zones, maintaining the reaction mixture in said first zone until the said nitrosating agent has reacted substantially completely with the cyclohexanoyl compound, while removing heat from the reaction mixture at such a rate as to maintain the temperature of the reaction mixture in the range between about 30° C. and about 110° C.; successively passing the reaction mixture comprising unreacted cyclohexanoyl compound and reacted cyclohexanoyl compound through at least one further reaction zone, supplying of each further reaction zone for reaction with said partially reacted cyclohexanoyl compound nitrosating agent in an amount not exceeding 65% by weight of the overall amount fed in all of the reaction zones, maintaining the reaction mixture in said zone until the said nitrosating agent has reacted substantially completely with the cyclohexanoyl compound, while removing heat from the reaction mixture at such a rate as to maintain the temperature of said mixture in the range between about 30° C. and about 110° C.

2. Process according to claim 1, wherein said cyclohexanoyl compound is a member of the group consisting of hexahydrobenzoic acid and derivatives thereof and the said temperature is maintained in the range between about 60° C. and about 110° C.

3. Process according to claim 2, wherein said temperature is maintained in the range between about 72° C. and about 98° C.

4. Process according to claim 1, wherein said cyclohexanoyl compound is a ketone and said temperature is maintained in the range between 30° and 110° C.

5. Process according to claim 1, wherein the temperature in each succeeding zone is kept equal to or higher than the temperature in the preceding zone.

6. Process according to claim 1, wherein the total residence time is comprised between 5 and 60 minutes.

7. Process according to claim 1, wherein the removal of heat is effected by indirect heat exchange with a cooling medium and in each zone the cooling medium is kept at a temperature at least equal to the temperature of the cooling medium in the preceding zone.

8. Process according to claim 2, wherein the temperature of the cooling medium used for removing the reaction heat, is not lower than 20° C. at the beginning and for the whole period of the reaction during which the reaction speed remains almost unvaried, and is not lower than 60° C. at the end of the reaction when the reaction speed tends to decrease.

9. Process according to claim 1 wherein the residence time in each successive zone is increased as compared with the residence time in the preceding zone.

10. Process according to claim 1 wherein sulfur trioxide is used, and all of the sulfur trioxide is introduced in said first zone.

References Cited

UNITED STATES PATENTS 3,022,291   2/1962   Muench et al. _____ 260—239.3

JOHN D. RANDOLPH, *Primary Examiner.*

ROBERT T. BOND, *Assistant Examiner.*